INVENTOR.
W. E. POLITZ
BY Robb & Robb
attorneys

INVENTOR.
W. E. POLITZ

United States Patent Office 3,427,049
Patented Feb. 11, 1969

3,427,049
FITTING MOUNTING MEANS
William E. Politz, Delphi, Ind., assignor to Stephen A. Young, Monticello, Ind.
Filed Nov. 10, 1966, Ser. No. 593,465
U.S. Cl. 285—46     7 Claims
Int. Cl. F16l *5/00, 55/00;* E03c *1/048*

ABSTRACT OF THE DISCLOSURE

This invention discloses means for connecting a plumbing fitting to a fixture or the like without resort to the usual nuts threaded on shanks of such fittings which shanks fit through openings in the walls of the fittings. The primary purpose is to enable the installation of the fitting from the top or from a position above the fixture since in most cases fixtures have limited room for wrench manipulation therebeneath. The invention further contemplates the use of certain cam members of various forms to act as wedges between the shanks of plumbing fittings and openings through which such shanks fit to prevent the undesired misplacement of the fitting with respect to said fixtures. The cam members are adjustable so that the fitting may be secured in the walls of fixtures, which walls vary in thickness from very thin to rather thick, thus in effect a universal mounting arrangement is provided by the cam means disclosed.

---

This invention relates to fitting mounting means and particularly to fittings which are specifically denominated as plumbing brass and even more specifically as those fittings which are exposed or mounted in exposed relation to lavatories, sinks tubs or the like.

One of the primary problems involved in positioning a brass fitting of the class hereinunder consideration with respect to a sink or lavatory, is that the shank of the fitting through which the water is directed into the fitting, is normally entered in an opening extending through the body of the fixture, for example a lavatory fixture and necessarily the shank is threaded with a lock nut threadedly engaged on the shank and adapted to engage the underside of the wall of the fixture. Since the space limitations are usually very restricted, it is difficult to manipulate a wrench or other tool so as to tighten the lock nuts and thus the mounting of a fitting on a fixture is a time taking and often difficult job.

It is a primary object of the present invention to obviate all the foregoing difficulties suggested and known to those skilled in the art, by providing a means for locking the fitting in place from above or from the outer side of the fixture without the necessity to manipulate lock nuts onto the shanks, the entire operation being performed from above or the top as the case may be.

Another object of the invention is to provide a novel arrangement of parts in which a lock member is manipulated from the exterior of the fixture and by suitable means incorporated in the fitting without the necessity for the use of lock nuts or the like.

Yet another object of the invention is to provide a novel form of lock member which will accommodate different thicknesses of walls through which the fixture is inserted such thickness ranging from the usual steel sink to a ceramic or porcelain or cast iron sink, the variation of thickness often being on the order of from ⅟₁₆ to ½ inch, all being accommodated by the invention herein to be described.

Another object of the invention is to provide different forms of mounting means including lock members which are manipulable from the outer side of a fitting by a screw driver or the like so as to position the fitting on the fixture to prevent purposeful or accidental displacement of such fitting.

Other and further objects of the invention will be understood from a consideration of the specification appended hereto and disclosed in the drawings wherein.

Figure 6:
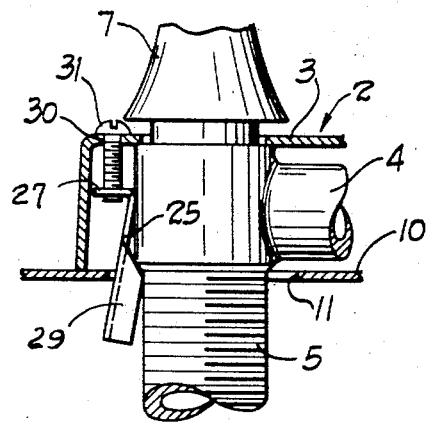
FIGURE 6 is a fragmentary sectional view disclosing a different form of lock member in initial position prior to its locking position.
Figure 5:
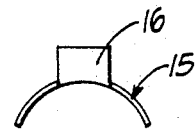
FIGURE 5 is a top view of such lock member.
Figure 7:
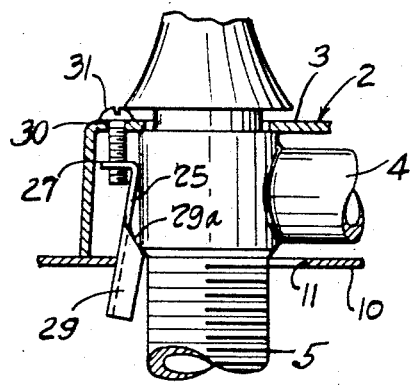

FIGURE 7 discloses a lock member as in FIGURE 6 moved into locking position.

Figure 8:
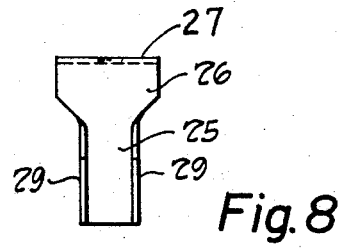

FIGURE 8 illustrates the lock member of FIGURES 6 and 7 in front elevation.

Figure 9:
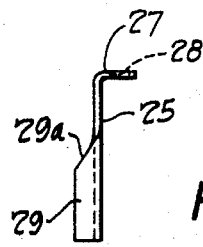

FIGURE 9 illustrates the lock member in side elevation.

Figure 1:
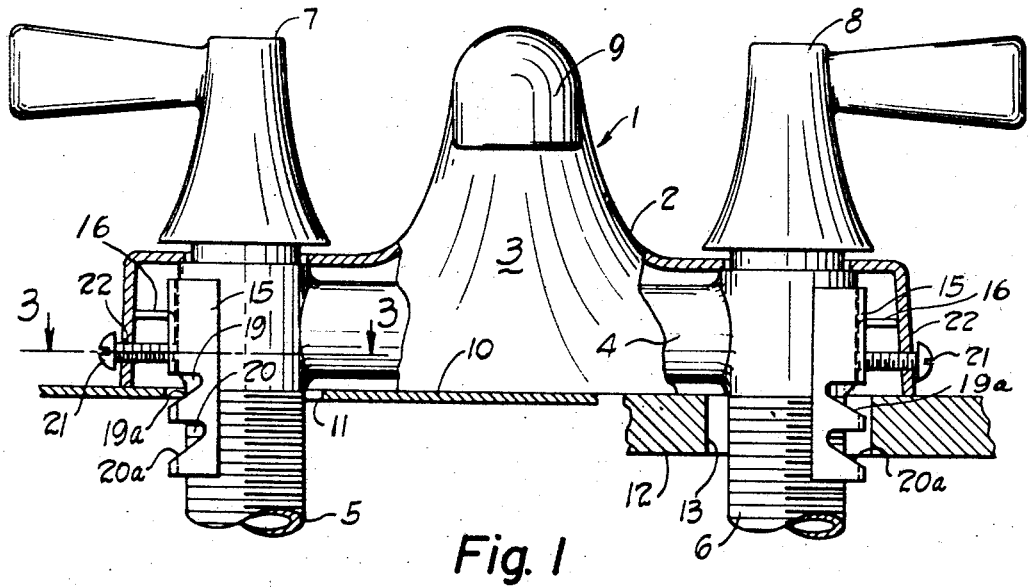
FIGURE 1 is a partial sectional view illustrating the initial position of the lock members with respect to different thicknesses of a sink or lavatory fixtures.

Referring now to FIGURE 1, and by way of example a lavatory fitting generally designated 1 as shown as comprising a body unit 2 including a cover 3 which encloses a body 4, the body 4 being of the usual lavatory type and having the shanks 5 and 6 extending downwardly therefrom.

At the upper ends of the shanks are positioned the usual valve control means 7 and 8 respectively which regulate the admission of water through the shanks from the supply and the discharge from the spout portion 9, all the foregoing being generally conventional. It will be noted that the cover 3 of the fitting unit 1 encloses the body member 4 and is usually chrome plated and provides the neat exterior appearance with which such fittings are desirably manufactured.

Since a fitting as in FIGURE 1, or equivalent is intended to be mounted on sinks, lavatories or tubs of different thicknesses, it will be noted that a portion of the lavatory upon which the instant unit is mounted is indicated at 10 as being a steel unit with the wall having the mounting opening 11 extending therethrough but at the other side of the figure, the wall is indicated at 12 having an opening 13 therethrough, the wall 12 being substantially thicker by way of illustration of one of the unique features of the instant invention which is to provide for positioning fittings on walls of fixtures having different thicknesses.

Figure 3:
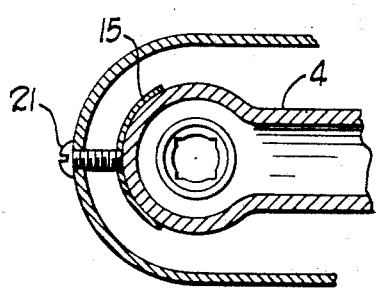
FIGURE 3 is a fragmentary sectional view taken about on the line 3—3 of FIGURE 1 looking in the direction of the arrows.
Figure 4:
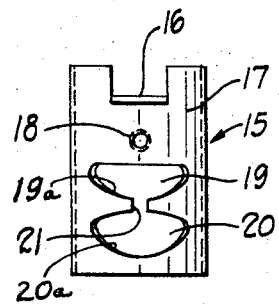
FIGURE 4 is a front view of one of the lock members by itself.

Turning now to a consideration of the actual lock members used herein, for engaging the fixture whether it have the wall 10 or 12, it will be seen that the lock member is an elongated arcuate part designated 15 preferably formed of metal and arranged with a radius so as to substantially conform to the radius of the portion of the body 4 from which the shanks 5 and 6 extend as indicated in FIGURE 3.

The lock member 15 includes a tongue 16 formed so as to extend outwardly from such member and the body 17 thereof, the body 17 of the member further including a threaded opening 18 therein, which will be subsequently explained.

In addition to the previously described tongue 16 and threaded opening 18, the body 17 of the lock member 15 is provided with cam means in the form of notches 19 and 20. The portion of the lock member between the notches 19 and 20 is severed at 21 to provide flexibility subsequently pointed out. It will be noted from a consideration of FIGURES 1 and 2 again that the lock members 15 in this instance two being provided, are positioned so as to lie generally along the shanks 5 and 6 and the portion of the body 4 from which the shanks extend, and be engaged threadedly by suitable screws 21 which are entered in openings 22 provided in the cover 3 previously mentioned.

With the lock members 15 positioned as indicated in FIGURE 1 the fitting 1 may be mounted on the wall 10 for example so that the shanks 5 and 6 extend through the openings 11 and 13 with the cover seated on the upper surface of the wall 10 in the usual position commonly provided for such fittings.

Figure 2:
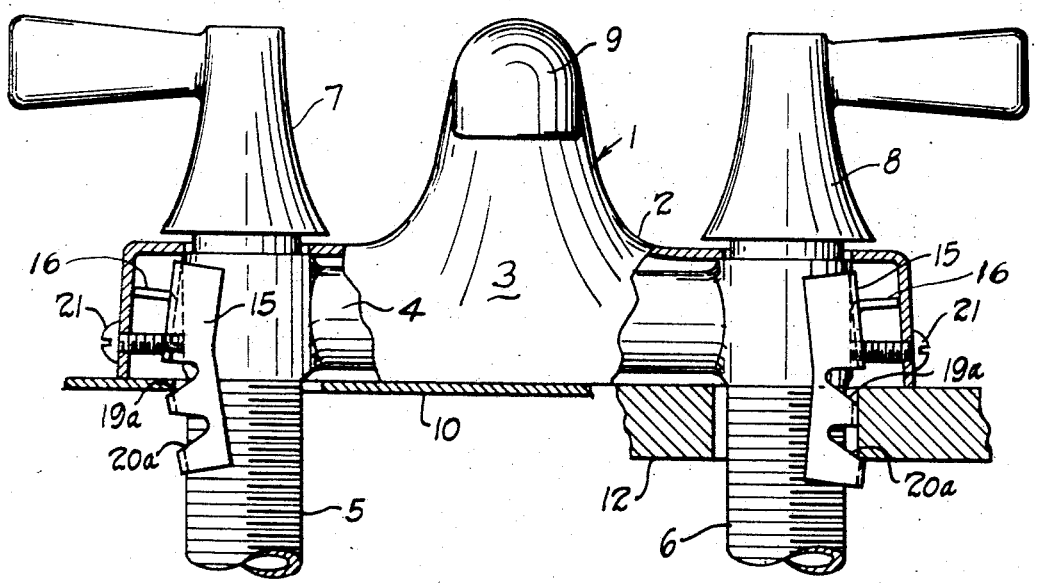
FIGURE 2 illustrates the lock members in locked position to prevent the withdrawal of the fitting from the fixture.

Thereafter the screws 21 are manipulated so that the lock members 15 are drawn outwardly or over to the left and right respectively as viewed in the FIGURES 1 and 2, the tongue 16 in each case impinging against the interior of the cover 3 and the cam members 19 and 20 pulled so that the surface 19a at the left in FIGURE 1 is moved into the position illustrated in FIGURE 2 with the surface 19a under the wall 10 and partly extending beyond the opening 11. It will be observed therefore that a locking effect is provided and the lock member 15 slightly bent by the appropriate tightening of the screw 21. At the same time or in any suitable sequence, the other screw 21 at the opposite end of the cover 3 may be manipulated so as to move the lock member 15 into a similar position. In this case since the wall 12 is much thicker, the cam surface 20a will engage beneath the wall and extend outwardly beyond the opening 13. It will be seen therefore that it is desirable to have a substantial flexing of the section between the cam members 19 and 20 and thus the provision of the opening 21 to permit a slight collapsing action when the member 15 is manipulated on or with respect to a wall of greater thickness than the wall 10.

In view of the manipulation just described of the respective lock members 15, it will be observed that the lavatory fitting illustrated is firmly positioned with respect to the lavatory fixture, without the use of lock nuts, but in such a manner as to be readily removable by manipulation of the screws 21 to release the tension directed to the members when occasion demands.

While it is desirable to provide under some conditions for the screws 21 to extend outwardly in the manner disclosed in FIGURES 1 and 2, under some circumstances it might be desirable to have the screws positioned differently and to that end the modification of the lock member shown in FIGURES 6 to 9 inclusive will now be described.

Availing of the same lavatory fitting by way of illustration, the body unit will be designated 2 likewise, and includes a suitable body 4 within the cover 3 and a shank 5 with a handle for the control of water flow at 7.

In this particular instance the parts just described may be of course duplicated at a suitable spaced interval and extend through an opening 11 in a lavatory fixture in the wall 10, for example.

With the foregoing in mind the lock member in this particular instance will now be described and shown in FIGURE 8 as comprising a body 25 which is of elongated nature being flared at the upper end if desired as indicated at 26 and having the upper end bent as indicated at 27 to form a portion in which a suitable threaded opening 28 may be located.

In this instance the cam means are provided by bending out of the body 25 the longitudinally extending portions 29 provided with cam surfaces 29a as indicated in FIGURE 9.

In this instance the cover 3 is provided with an opening at 30 through which a suitable screw such as 31 may be inserted to engage threadedly with the opening 28 in the lock member 25.

The lock member 25 is intended to be arranged as indicated in FIGURE 6 so as to lie along the shank 5 and portion of the body 4 to which the shank is connected, and about as indicated in FIGURE 6 for insertion into the opening 11 with the positioning of the fitting 2 on the fixture.

Thereafter manipulation of the screw 31 as indicated by the position disclosed in FIGURE 7 will raise the lock member 25 so that the cam surfaces 29a will, in cooperation with the other portion of the body, provide wedging action in the opening 11 in conjunction with the shank and body portion to which it is connected, there being desirably a like arrangement at the opposite end of the fitting similarly manipulated to provide the wedging action of a like lock member 25.

It will be further apparent that the release of the lock members by manipulation of the screws may be effected to withdraw the fitting if necessary.

It should be noted that usually the shanks such as 5 and 6 of the respective fittings are of substantial length to provide for varying thicknesses of walls through which they extend as well as to provide for connection of the lower ends thereof to the supply lines and are threaded throughout their entire length as illustrated. It should be recognized that much of the threading may be obviated since the slip nut for connection of the supply is only required at the lower end and thus the threads may be reduced in extent and the cost of the fittings provided substantially and materially lessened by the structure disclosed herein. It is also noted that since the slip nuts and supply lines could be initially connected together onto the shanks and inserted from the top, that the entire operation of mounting a fitting of the nature herein disclosed may be effected without getting under the sink or lavatory or other fixture and by subsequent simple manipulation of the lock members of whatever form, suitably position the fitting on the fixture so as to provide for complete top mounting thereof.

I claim:

1. In fitting mounting means of the class described, in combination, a fitting body unit, including a body and a cover therefor, a shank extending from the body and through an opening in the wall of a fixture or the like, such wall varying in thickness in different fixtures, a lock member supported by the cover for movement within the outline of the cover between a disengaged and an engaged position, cam means in the lock member, said cam means being positioned between the shank and the wall which surrounds such opening and externally adjustable means operably connected to the cam means to move said cam means into a position engaging both the walls surrounding said opening and said shank whereby to prevent removal of the shank from said opening.

2. The combination as claimed in claim 1 wherein the cover is mounted on the body member to at least partly surround the same, the cam means are positioned within the area outlined by the cover, and the means to move the cam means comprises a screw threadedly engaging the lock member and extending through the cover for manipulation exteriorly thereof.

3. The combination as claimed in claim 2 wherein the cam means comprise surfaces positioned angularly with respect to the shank and wall to effect a wedging action between the wall surrounding such opening and the shank.

4. A combination as claimed in claim 2, wherein the cam means comprise spaced notches formed in the lock member, the lock member being arcuate and having a tongue extending outwardly therefrom for engagement with the cover referred to, and the screw is mounted in the lock member and operable as a fulcrum to move the cam means into engagement with the wall and the tongue into engagement with the cover.

5. A combination as claimed in claim 3, wherein the surfaces extend from an elongated base, one end of the base includes threads for engagement by the screw and the screw extends substantially parallel with the shank to a position externally of the cover to maintain the same on the body.

6. The combination as claimed in claim 2, wherein the cam means comprise notches spaced along the lock member, a portion of the lock member intermediate the notches comprising flexible arm portions for yielding engagement with the wall surrounding the opening.

7. The combination as claimed in claim 2, wherein the lock member includes a tongue extending therefrom for engagement with the cover, the cam moving means comprises a screw extending through the cover and arranged to draw the member toward the cover, to bring the cam means into operative engagement with the opening.

References Cited

UNITED STATES PATENTS

| | | | |
|---|---|---|---|
| 128,063 | 6/1872 | Penfield | 285—194 X |
| 852,220 | 4/1907 | Cecil | 285—193 |
| 913,892 | 3/1909 | Holmes | 285—420 X |
| 2,003,676 | 6/1935 | Bonnell | 285—218 |
| 2,552,149 | 5/1951 | Clark et al. | 285—194 X |
| 2,684,082 | 7/1954 | Bletcher | 285—193 X |
| 2,872,246 | 2/1959 | Zierden | 137—359 X |
| 3,010,474 | 11/1961 | Moen | 285—193 |

CARL W. TOMLIN, *Primary Examiner.*

W. L. SHEDD, *Assistant Examiner.*

U. S. Cl. X.R.

285—421, 193; 4—192